United States Patent [19]
Fernandez

[11] Patent Number: 5,913,547
[45] Date of Patent: Jun. 22, 1999

[54] P.T.O. SECUREMENT METHOD

[75] Inventor: Rickey J. Fernandez, Broken Aarow, Okla.

[73] Assignee: Muncie Power Products, Inc., Muncie, Ind.

[21] Appl. No.: 08/886,125

[22] Filed: Jul. 3, 1997

[51] Int. Cl.⁶ .............................. B23P 11/00; F16H 37/00; F16B 35/00
[52] U.S. Cl. ........................ 29/525.02; 74/11; 74/606 R; 411/389
[58] Field of Search ............................... 411/389; 74/11, 74/15.86, 606 R; 301/35.62; 29/525.02, 525.11

[56] References Cited

U.S. PATENT DOCUMENTS

| | | | |
|---|---|---|---|
| 1,539,826 | 6/1925 | Boutelle | 411/307 |
| 2,231,207 | 2/1941 | Baker | 301/35.62 |
| 2,336,767 | 12/1943 | Ash | 301/35.62 |
| 3,800,557 | 4/1974 | Tobin | 464/94 |
| 4,195,717 | 4/1980 | Williams | 192/18 A |
| 4,295,748 | 10/1981 | Ohara | 403/24 |
| 4,573,366 | 3/1986 | Kennard | 74/15.86 |
| 4,610,175 | 9/1986 | Weis et al. | 74/11 |
| 4,815,907 | 3/1989 | Williamson et al. | 411/107 |
| 5,044,228 | 9/1991 | Rugraff | 74/606 R |
| 5,536,127 | 7/1996 | Pennig | 411/413 |

FOREIGN PATENT DOCUMENTS

767777  6/1953  Germany ............................... 411/389

*Primary Examiner*—John A. Jeffery
*Assistant Examiner*—William C. Joyce
*Attorney, Agent, or Firm*—Hall, Priddy & Myers

[57] ABSTRACT

A system for providing sufficient space to accommodate a wrench for tightening the securing nuts in the restricted confines of a power take off mounted to a vehicle's transmission which employs step studs whose large diameter ends are threaded into the standard S.A.E. hole pattern apertures of the transmission P.T.O. window, while the studs are designed to have significantly smaller opposite ends which protrude through the aligned P.T.O. housing apertures, thus allowing smaller nuts to be used to make room for the wrench.

2 Claims, 3 Drawing Sheets

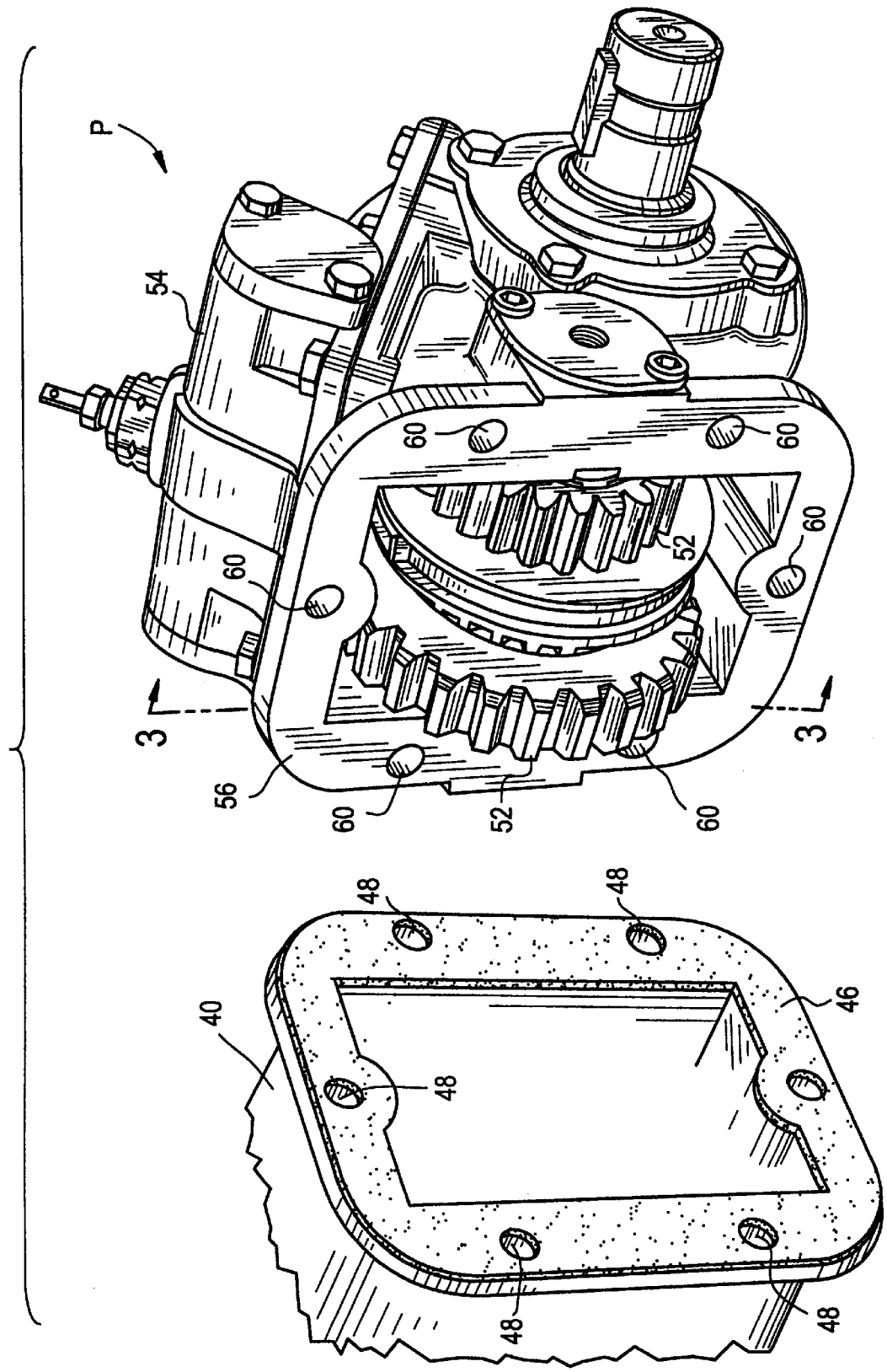

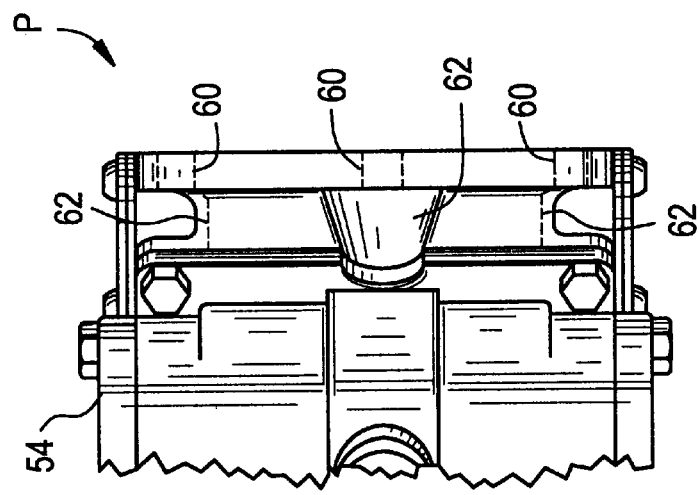
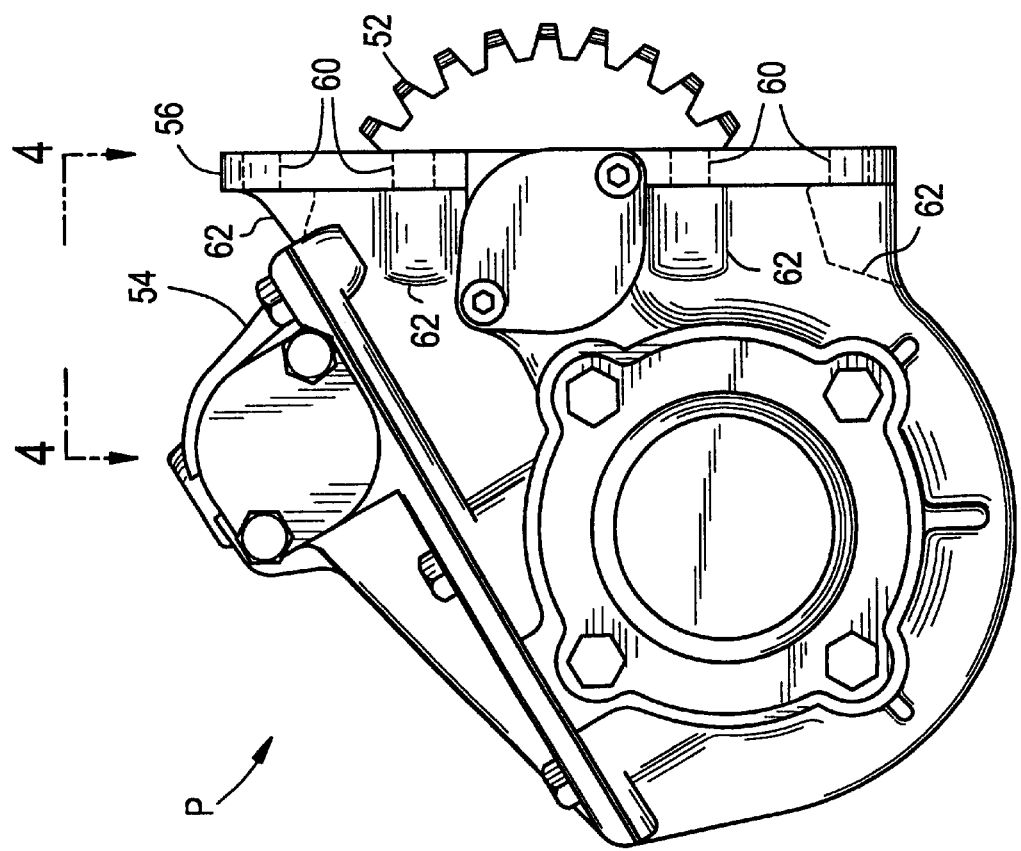

P.T.O. SECUREMENT METHOD

FIELD OF THE INVENTION

The present invention relates to an improvement in the mounting of a power take off device to a transmission. More particularly, the present invention relates to a means for facilitating the securing of a power take off device to a transmission and method associated therewith.

BACKGROUND OF THE INVENTION

A power take off (P.T.O.) device is a mechanical device used to operate various components, such as hydraulic pumps or mechanical devices, by taking advantage of the power of a transmission. To receive input from a transmission, a P.T.O. device is mounted such that one of the P.T.O. gears engages a transmission gear. The P.T.O. is mounted to the transmission at an opening generally provided by the transmission manufacturer. An example of a standard opening provided by transmission manufacturers is the SAE 6 BOLT P.T.O opening.

Over the years, while the transmission opening has remained the same, the P.T.O. housings that mount to the openings have grown to accommodate larger gears. In order to pull the most horsepower possible from the transmission openings, the size of the P.T.O. gears must be maximized, resulting in larger P.T.O. gears and thus, larger P.T.O housings.

To mount a standard 6 BOLT P.T.O. device to a transmission having a 6 BOLT opening, six threaded studs with a respective securing nut or six capscrews have been used. The space allotted for the studs with nuts or capscrews has become minimal due to the clearance problems associated with the use of larger P.T.O housings. To install and retain the P.T.O. device to the transmission by way of a standard stud with a nut, a box wrench is most conveniently used to tighten the nut. Frequently, the wrench must be ground or cut down to be able to fit over the head of the nut in order to tighten the nuts, due to clearance problems with the P.T.O. housing. Even modified wrenches do not always allow sufficient room to tighten the nut properly.

Thus, there is a need in the art for a method and device which facilitates the attachment of a standard P.T.O. device to a standard P.T.O. opening on a transmission. It is a purpose of this invention to fulfill this and other needs in the art which will become more apparent to the skilled artisan once given the following disclosure.

SUMMARY OF THE INVENTION

Generally speaking, this invention fulfills the above-described needs in the art, by providing a securement assembly for securing a power take off device to a transmission. The power take off device includes a plurality of apertures for receiving a plurality of securement means. The transmission includes a plurality of apertures which may be aligned with each aperture of said power take off device and secured by the securement means and wherein there is a limited space between the plurality of apertures of the power take off device and the housing of the power take off device. The securement means includes a plurality of studs each having a head and tail portion. Each head portion includes a non-threaded portion disposed at an interface of the head and tail portion. Each head portion is adapted for being screwed into a respective, aligned aperture of the transmission. Each non-threaded portion of the head portions is adapted to receive a plurality of apertures of the power take off device such that the power take off device is supported and aligned for securement thereby. Each tail portion protrudes from a respective aperture of the power take off device and is adapted to receive a smaller nut for rigidly securing the power take off device to the transmission.

This invention fulfills further needs in the art by providing a method for securing a power take off device to a transmission by a plurality of stepstuds. The transmission includes a housing and an opening for operatively receiving a power take off device. The power take off device includes a plurality of apertures for receiving a plurality of securement means. The transmission housing includes a plurality of apertures which may be aligned with the apertures of the power take off device and secured by the securement means. The securement means include a plurality of stepstuds each having a head and tail portion. The head portion includes a non-threaded portion which is disposed at an interface of the head and tail portion. Each head portion is screwed into a respective aperture of the transmission housing such that each non-threaded portion of the head portions protrude from the transmission. The plurality of apertures of the power take off device are aligned onto a respective protruding non-threaded head portion such that the power take off device is supported on the non-threaded head portions and said tail portion protrudes from a respective aperture of the power take off device and from which a plurality of nuts may be secured so that said power take off device is rigidly secured to the transmission housing. The respective nuts are screwed onto respective tail portions of the stepstuds.

The invention will now be described with respect to certain embodiments thereof as illustrated in the following drawings, wherein:

BRIEF DESCRIPTION OF THE DRAWINGS

FIG. 2 is an exploded view of a transmission and a P.T.O. device to be secured according to the present invention;

FIG. 3 is a side elevational view of the power take off device taken along lines 3—3 of FIG. 2;

FIG. 4 is a fragmentary top plan view of the power take off device as seen from lines 4—4 of FIG. 3;

DETAILED DESCRIPTION OF THE PREFERRED EMBODIMENT

Figure 1:
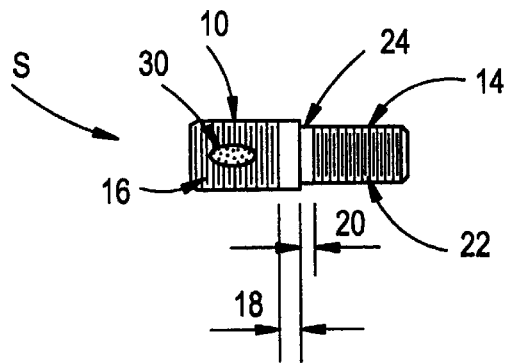
FIG. 1 is a side view of the stepstud of the present invention.

Attention is directed to FIG. 1 of the drawings. In this figure, there is illustrated one embodiment of a stepstud S which may be used in the practice of this invention. Stepstud S is designed to improve the ease by which a power take off device may be mounted and secured to a transmission. Stepstud S includes a head portion 10 and a tail portion 14, the diameter of head portion 10 of which is larger than the diameter of tail portion 14.

Head portion 10 of stepstud S includes a threaded portion 16 and a non-threaded portion 18. Similarly, tail portion 14 of stepstud S includes a non-threaded portion 20 and a threaded portion 22. Stepstud S is configured so that threaded portions 16 and 22 are located at its ends, while the non-threaded portions 18 and 20 are located at interface 24 of head portion 10 and tail portion 14.

Given this configuration stepstud S may now be used to mount a power take off device to a transmission and at the same time overcome the above-described problem in the prior art.

With reference in particular to FIG. 2, there is illustrated a power take off device P to be mounted to a transmission T. Transmission T is provided with a transmission housing 40 which houses a plurality of drive gears (not shown), and an opening 44 which allows access to the gears. Transmission T also includes a mounting flange 46 with a plurality of threaded apertures 48 disposed along its perimeter. In the preferred embodiment, transmission opening 40 is a standardized S.A.E. 6 BOLT opening with a hexagonal pattern. It should be understood that the present invention is not limited to the six-hole standardized pattern disclosed herein, but may be used with an eight hole octagonal pattern, or any other power take off device and transmission having complimentary bolt hole patterns.

Similarly, power take off device P includes gears 52 which engage complimentary transmission gears (not shown), housing 54 which houses gears 52, and a mounting flange 56. Like transmission housing 40, P.T.O. mounting flange 56 conventionally includes a plurality of apertures 60 disposed along its perimeter which are designed to align with apertures 48 of transmission mounting flange 46. Each pair of aligned apertures may be secured by a stud with a nut.

Because of the size of the P.T.O. housing 54 (as shown in FIG. 2), the standard threaded stud with a nut gives rise to the above-described problem when securing the P.T.O. unit P to transmission T.

With particular reference to FIGS. 3 and 4, the space surrounding apertures 60 along the P.T.O. mounting flange 56 from which a nut is secured, is limited due to the size and configuration of the P.T.O. housing. Typically, as is shown in the FIG. 3 and 4, grooves 62 are designed into the housing proximate each aperture 60 to facilitate use of a tool to secure each nut. However, even this space has become minimal due to the increase in size of the P.T.O. housings. Thus, it becomes difficult to secure a nut to the protruding tail portion of a stud.

The use of the Stepstud S of the present invention to secure P.T.O. device P to transmission T, on the other hand, substantially eliminates this problem by providing a smaller tail portion 14 from which a smaller nut may be more easily used for securement. The use of a smaller nut allows for a smaller wrench or the like to be used which can then grasp and manipulate the associated nuts, without potential interference by or contact with the P.T.O. housing, and without having to either design a special wrench, or cut a standard wrench to size.

Figure 5:
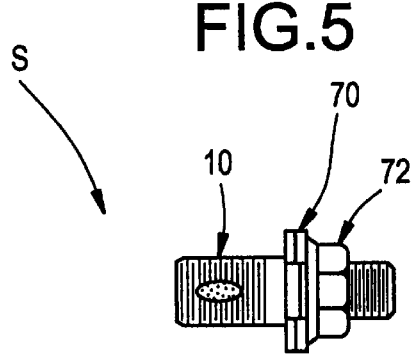
FIG. 5 is a side view of the stepstud as it is installed according to the present invention.

With reference to FIG. 5, the securement of P.T.O. device P to transmission T by a plurality of stepstuds S will now be described. In the preferred embodiment, P.T.O. mounting flange 56 and transmission housing 40 each have six apertures having equal diameters. Each aperture 48 of transmission housing 40 is threaded on the inside to receive a standard stud. A typical, standard 6 BOLT P.T.O. opening on a transmission includes threaded apertures 48 with a ⅜" diameter. Thus, the head portion 10 of stepstud S is sized to screw inside the apertures 48 of transmission housing 40 (e.g. a matching ⅜" diameter).

Before the P.T.O. device P is aligned with transmission T for securement, a head portion 10 of a stepstud S is screwed into an aperture 48 of transmission housing 40. To facilitate this securement, two flat washers 70 and nut 72 are used. Flat washers 70 are placed through tail portion 14 until they abut interface 24 of head portion 10 and tail portion 14. In the preferred embodiment, two ⁵⁄₁₆" flat washers are used and are received on tail portion 14 which is also ⁵⁄₁₆". Nut 72 is screwed onto the threads of tail portion 14 until nut 72 abuts flat washers 70. Once nut 72 abuts flat washers 70, stepstud S is installed into the transmission by twisting of nut 72 by a wrench or the like. Threaded portion 16 of head portion 10 screws into threaded apertures 48 of transmission housing 40 until the threads bottom out, leaving non threaded portion 18 protruding from transmission housing 40.

The above identified described installment of stepstud S into an aperture 48 of transmission housing 40 is repeated for all apertures 48 of transmission housing 40. Once stepstuds S are installed into all apertures 48 of transmission housing 40, the P.T.O. device P may be aligned for securement. The protruding non-threaded portions 18 provide a surface from which apertures 60 of P.T.O. device P may be mounted. The diameter of apertures 60 of P.T.O. device P should be about the same as the diameter of the non-threaded portions 18, thus sufficiently providing the proper alignment, and stability for mounting the P.T.O. device P.

Figure 6:
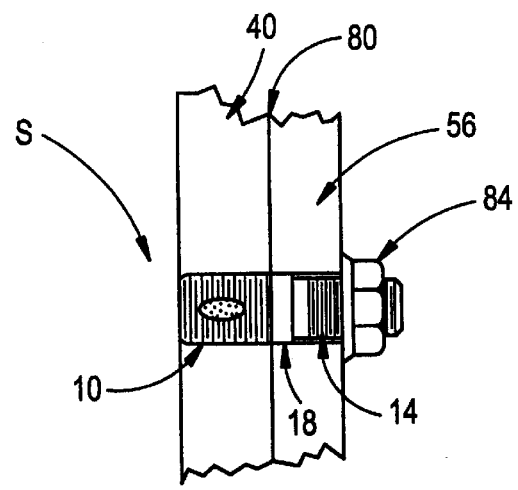
FIG. 6 is a side view of the stepstud as it is used according to the present invention.

With reference now to FIG. 6, the P.T.O. mounting flange 56 is placed on non-threaded portion 18 such that flange 56 abuts transmission housing 40. In addition, a sealant 80 may be placed between P.T.O. mounting flange 56 and transmission housing 40, and can be a gasket or any suitable sealant material which will prevent fluid leakage.

Once the P.T.O. mounting flange 56 is aligned and supported on non-threaded portion 18 of head portion 10, each threaded tail portion 14 of a respective stepstud S may be secured by a flange nut 84. In a preferred embodiment, threaded tail portions 14 have a ⁵⁄₁₆" diameter and are secured by standard ⁵⁄₁₆" flange nuts. Thus, a smaller wrench or the like can be used to tighten the nuts to retain the P.T.O. device P to transmission T. For example, in one preferred embodiment, a convenutal ½" end or box wrench may be used to tighten the nuts. In this way the clearance problem is avoided, while only a conventional wrench is needed to insure proper securement between a P.T.O. device P and a transmission T without thread damage to the exposed P.T.O. stud threads, such as might occur if a stud tool were employed.

An adhesive 30 may optionally be applied to the threads of the head portion 10 to improve the securement of stepstud S to the transmission. The adhesive may be Loctite Dri-lock #202 threadlocker or 3M Scotchgrip #2353 fastener adhesive.

Once given the above disclosure, many other features, modifications, and improvements will become apparent to the skilled artisan. Such features, modifications, and improvements are therefore to be considered a part of this invention, the scope of which is to be determined by the following claims:

I claim:

1. A method for securing a power take off device to a transmission by a plurality of stepstud bolts, comprising the steps of:

providing a transmission for having secured thereto the power take off device, said transmission having a housing and an opening for operatively receiving a power take off device, said power take off device having a plurality of apertures for receiving a plurality of securement means, said transmission housing having a plurality of apertures which may be aligned with said apertures of said power take off device and secured by said securement means, said securement means are a plurality of stepstud bolts each having a head and tail portion;

securing each said head portion of said stepstud bolts into a respective aperture of said transmission housing such that said tail portion protrudes from said transmission housing;

aligning said plurality of apertures of said power take off device with said protruding tail portion such that each said tail portion protrudes from a respective aperture of said power take off device from which a plurality of nuts may be secured to said protruding tail portions; and securing a respective nut to each said protruding tail portion of said stepstud bolts;

wherein said steps of securing said head portions of said stepstud bolts into said plurality of apertures of said transmission housing includes placing two flat washers on each of said tail portions until said flat washers abut said head portion, screwing a nut onto each of said tail portions until said nut abuts said flat washers, and screwing said stepstud bolts into said plurality of apertures by twisting said nut.

2. A method according to claim 1 which further includes the step of positioning a sealing means between said transmission housing and said power take off device.

* * * * *